United States Patent
Sitzler et al.

(10) Patent No.: US 11,338,376 B2
(45) Date of Patent: May 24, 2022

(54) TOOL HEAD AND TOOL SYSTEM INCLUDING A TOOL HEAD

(71) Applicant: Ledermann GmbH & Co. KG, Horb am Neckar (DE)

(72) Inventors: Benjamin Sitzler, Sulz am Neckar (DE); Thomas Nope, Kalletal (DE)

(73) Assignee: Ledermann GmbH & Co. KG, Horb am Neckar (DE)

( * ) Notice: Subject to any disclaimer, the term of this patent is extended or adjusted under 35 U.S.C. 154(b) by 301 days.

(21) Appl. No.: 16/518,646

(22) Filed: Jul. 22, 2019

(65) Prior Publication Data

US 2019/0388980 A1 Dec. 26, 2019

Related U.S. Application Data

(63) Continuation of application No. PCT/EP2018/051114, filed on Jan. 17, 2018.

(30) Foreign Application Priority Data

Jan. 25, 2017 (EP) .................................... 17000141

(51) Int. Cl.
*B23C 5/12* (2006.01)
*B23C 5/00* (2006.01)
(Continued)

(52) U.S. Cl.
CPC ................ *B23C 5/006* (2013.01); *B23C 3/12* (2013.01); *B23C 5/14* (2013.01)

(58) Field of Classification Search
CPC .. B23C 3/12; B23C 5/14; B23C 5/006; B23C 5/2458; B23C 2210/242; B23C 2210/244;
(Continued)

(56) References Cited

U.S. PATENT DOCUMENTS 10,011,039 B2 7/2018 Kalmbach
2004/0089376 A1 5/2004 Rose et al.

FOREIGN PATENT DOCUMENTS

CN 101372048 A 2/2009
CN 101462282 A 6/2009
(Continued)

OTHER PUBLICATIONS

Machine translation of DE202010010704U1, pp. 1-15 (Year: 2021).*
(Continued)

*Primary Examiner* — Ryan Rufo
(74) *Attorney, Agent, or Firm* — Walter Ottesen, P.A.

(57) ABSTRACT

A tool head is for machining edges of a workpiece and includes a first tool section with first blades and a second tool section with second blades. The second blades are positioned between the first blades when seen in the circumferential direction. The second section is movable relative to the first section in the direction of the longitudinal axis between a passive and active position. The second blades are axially recessed relative to the first blades in the passive position and project axially outwards between the first blades in the active position. The tool head has a pressure switching mechanism for moving the second tool section between the passive and active position. In a tool system, the tool head and an actuation element can be moved axially relative to each other. The at least one actuation surface and the actuation element are configured to be axially pressed towards each other.

11 Claims, 3 Drawing Sheets

(51) Int. Cl.
*B23C 3/12* (2006.01)
*B23C 5/14* (2006.01)

(58) Field of Classification Search
CPC ........ B23C 2210/287; B23C 2220/605; B23C 2220/16; B23C 2220/20; B23C 3/126; B23C 5/2455; B23C 2260/04; B23D 2277/081
See application file for complete search history.

(56) References Cited

FOREIGN PATENT DOCUMENTS

| | | | |
|---|---|---|---|
| CN | 102596463 A | 7/2012 | |
| DE | 202010010704 U1 * | 11/2011 | ............. B27D 5/006 |
| DE | 102013010359 A1 | 12/2013 | |
| EP | 1044772 A2 | 10/2000 | |
| EP | 1 716 994 A1 | 11/2006 | |
| EP | 2011614 A1 | 1/2009 | |
| EP | 2363259 A1 | 9/2011 | |
| EP | 2492071 A2 | 8/2012 | |
| EP | 2886272 A1 | 6/2015 | |
| JP | H08155906 A | 6/1996 | |
| JP | 2000326309 A | 11/2000 | |
| JP | 2005074949 A | 3/2005 | |
| RU | 2 166 402 C1 | 5/2001 | |
| SU | 841787 A1 | 6/1981 | |

OTHER PUBLICATIONS

International Search Report dated Mar. 28, 2018 of international application PCT/EP2018/051114 on which this application is based.
Office action and English translation of the Office action of the Chinese Patent Office dated May 7, 2020 in corresponding Chinese patent application 201880008288.3.

* cited by examiner

TOOL HEAD AND TOOL SYSTEM INCLUDING A TOOL HEAD

CROSS REFERENCE TO RELATED APPLICATION

This application is a continuation application of international patent application PCT/EP2018/051114, filed Jan. 17, 2018, designating the United States and claiming priority from European application 17000141.6, filed Jan. 25, 2017, and the entire content of both applications is incorporated herein by reference.

BACKGROUND OF THE INVENTION

Workpieces of different kinds require edge machining, for which purpose tool heads capable of being driven rotationally with circumferentially arranged blades are employed. Various kinds of edge machining or different machining steps must frequently be performed sequentially on the same workpiece. It may thus be necessary, for example, to chamfer a workpiece edge and to provide another edge of the same workpiece with a radius. Similarly, machining of the same workpiece edge in two different machining steps involving pre-machining and finish machining may also be considered. Suchlike machining steps can be carried out on continuous processing machines, in which the workpieces for processing are guided past milling units with suitable tool heads. As an alternative, appropriate tool heads can be attached to the milling spindle of a machining center, whereby the contour of the workpiece can then be traced and a form milling machining process can be performed.

Individual, different tool heads can be applied for each of the different edge machining steps, however, although this calls for costly and time-consuming replacement and readjustment. As an alternative, tool heads with two different sets of blades can find an application, wherein the two different sets of blades of the same tool head are brought into engagement with the workpiece edge as required. A suchlike tool head is already familiar, for example from EP 1 044 772 A2, and includes a first tool section with a set of first blades which are distributed over the circumference and a second tool section with a set of second blades which are distributed over the circumference. The second blades are positioned between the first blades when seen in the circumferential direction. The second tool section can be moved relative to the first tool section in the direction of the longitudinal axis back and forth between a passive position and an active position. The second blades are axially recessed relative to the first blades in the passive position, whereas they project axially between the first blades in the active position and in this way are able to be brought into engagement with the workpiece edge.

The second tool section is fixed hydraulically, both in the active position and in the passive position. The hydraulic fixing is released for the adjustment procedure, after which a pneumatic adjustment device then finds an application. The combination of hydraulic fixing and pneumatic adjustment is technically complex and also requires a corresponding installation space. Although use as an exchange assembly is taken into consideration, this is likely to be possible only to a limited degree having regard for the complexity of the system.

SUMMARY OF THE INVENTION

It is an object of the invention to further develop a tool head in such a way that adjustment and fixing are simplified significantly.

This object can, for example, be achieved via a tool head for machining edges of a workpiece. The tool head includes: a tool head body extending along a longitudinal axis and being configured to be driven rotationally about the longitudinal axis; the tool head body including a first tool section defining a first circumference and having a set of first blades distributed over the first circumference; the tool head body including a second tool section defining a second circumference and having a set of second blades distributed over the second circumference; the second blades being positioned between the first blades when seen in a circumferential direction; the second tool section being configured to be moved relative to the first tool section in a direction of the longitudinal axis back and forth between a passive position and an active position; the second blades being axially recessed relative to the first blades in the passive position; the second blades projecting axially between the first blades in the active position; and, the tool head body having a pressure switching mechanism configured to move the second tool section back and forth between the passive position and the active position.

It is a further object of the invention to provide a tool system, via which it is possible in a simplified fashion to switch back and forth between the use of two different sets of blades.

This object can, for example, be achieved by a tool system including: a tool head for machining edges of a workpiece; the tool head extending along a longitudinal axis and being configured to be driven rotationally about the longitudinal axis; the tool head including a first tool section defining a first circumference and having a set of first blades distributed over the first circumference; the tool head including a second tool section defining a second circumference and having a set of second blades distributed over the second circumference; the second blades being positioned between the first blades when seen in a circumferential direction; the second tool section being configured to be moveable relative to the first tool section in a direction of the longitudinal axis back and forth between a passive position and an active position; the second blades being axially recessed relative to the first blades in the passive position; the second blades projecting axially between the first blades in the active position; the tool head having a pressure switching mechanism configured to move the second tool section back and forth between the passive position and the active position; the pressure switching mechanism having at least one actuation surface acting in the axial direction; an actuation element; the tool head and the actuation element being configured to be moved axially relative to one another; and, the at least one actuation surface and the actuation element being configured to be pressed axially towards one another.

According to an aspect of the invention, it is proposed that the tool head has a pressure switching mechanism for moving the second tool section back and forth between the passive position and the active position. A pressure switching mechanism is by definition a mechanism which, as a result of a first pressure impulse, adopts a first switching state and, as a result of a further pressure impulse, adopts a second switching state. Switching back and forth between the two switching states or switching positions takes place alternately with each further pressure impulse. At the end of every switching impulse, however brief, locking takes place automatically in the respective selected switching position. With regard to the inventive tool head, this means that only a short pressure impulse or switching impulse is required for switching between two different deployed sets of blades, which, on the one hand, releases the locking that is present in the starting position and, on the other hand, brings about the switching from one position to the other position. Automatic locking then takes place in the changed position. Such a pressure switching mechanism is simple in terms of its construction and is also easy to operate. It can be integrated compactly into the tool head, so that no additional installation space is required. A tool head embodied in such a way can be used at will in continuous processing machines and can also be attached to milling spindles of a machining center, wherein a rapid and simple change between the two different sets of blades is possible in all deployment scenarios.

It may be expedient to provide a switching lever or the like, which is operated manually or automatically, for the operation of the pressure switching mechanism. In a preferred embodiment, the pressure switching mechanism has at least one and in particular a plurality of actuation surfaces distributed over the circumference acting in the axial direction. This provides an opportunity to move the tool head for the switching procedure briefly and in a pulsating manner against a fixed stop. As an alternative, the tool head can remain stationary, wherein the aforementioned abutment or a corresponding actuation element is then moved against the actuation surface of the tool head. Reciprocal axial pushing of the actuation surface and the actuation element takes place in any case, whereby the switching is then actuated. The angle of rotation position of the tool head does not matter in the case of a plurality of actuation surfaces distributed over the circumference. Sensors or the like that are fixed or capable of being displaced relative to the tool head are considered as an actuation element. In the case of an inventive tool system, in which, in addition to the tool head, a sensing roller also finds an application for tracing the contour of the workpiece, this sensing roller can advantageously assume the function of an actuation element. The possibility exists in this case, too, for the switching procedure to keep the tool head stationary and then to displace the sensing roller axially against the actuation surface of the tool head. Preferably, however, the tool head is displaced axially relative to the sensing roller. In the process, the at least one actuation surface is pressed briefly and in a pulsating manner axially against the sensing roller. The tool head subsequently returns to its starting position relative to the sensing roller, without a realignment being necessary.

In a further embodiment, the at least one actuation surface projects beyond the first blades and also beyond the second blades in the axial direction. As an alternative or in addition, it may be expedient for the at least one actuation surface to lie radially inside the first blades and the second blades. This ensures that there is no overlapping of the actuation surface with the blades. The actuation surfaces can be started without having to worry about a collision with the blade.

Various embodiments can be considered for the specific arrangement of the pressure switching mechanism. In a preferred arrangement, the pressure switching mechanism includes an axially spring pre-loaded feed sleeve, a pressure sleeve that is capable of being displaced by the actuation surface axially against the spring pre-loaded feed sleeve and an outer sleeve enclosing the feed sleeve and the pressure sleeve. The feed sleeve is rotatably mounted in the outer sleeve and has latching projections with angular faces acting in a direction of rotation. The pressure sleeve also has angular faces distributed over the circumference, wherein these angular faces correspond to the angular faces of the feed sleeve. First and second latching receptacles are arranged distributed alternately in the circumferential direction inside the outer sleeve with first and second axial abutments for the latching projections of the feed sleeve, wherein the first axial abutments are axially displaced relative to the second axial abutments.

A switching impulse acting on the actuation surface is transferred to the pressure sleeve, so that this is pressed axially against the feed sleeve. The feed sleeve lies initially in one of two locked switching positions with its latching projections either in the first latching receptacles or in the second latching receptacles, wherein it is pressed by its axial spring pre-loading respectively against the first or second axial abutments. The impact of the pressure sleeve now initially causes the feed sleeve to be displaced axially to such an extent that its latching projections are no longer retained in the respective latching receptacles. As soon as this axial state of displacement is achieved, the interplay of the angular faces of the pressure sleeve with the angular faces of the feed sleeve causes the feed sleeve to rotate through a specified angular value. As soon as the switching impulse comes to an end and the pressure sleeve has returned to its starting position, the feed sleeve in the rotated state is pressed back from its axially raised position because of its spring pre-loading. As a result, the latching projections then engage once again in corresponding latching receptacles and come to rest against the corresponding axial abutments. Because of the changed angle of rotation, however, the latching receptacles and latching projections which find an application in this case are those which lie adjacent to the preceding latching receptacles and latching projections in the circumferential direction.

The procedure described above is repeated in the case of a repeated pressure switching impulse. On each occasion, the feed sleeve continues to rotate through a suchlike angular value, which corresponds to the angular distance between two adjacent latching receptacles. Since first latching receptacles having first axial abutments and second latching receptacles having second axial abutments follow one another in the circumferential direction, the latching projections of the feed sleeve bear alternately against the first or second axial abutments having different, axially displaced positions in relation to one another. In overall terms, the feed sleeve is thus switched back and forth between two different axial positions. In addition, the second tool section bears against the feed sleeve, in particular under spring pre-loading, so that the second tool section is also switched back and forth between the two aforementioned axial positions. These two axial positions correspond to the active or passive position mentioned by way of introduction, so that either the set of first blades or the set of second blades is used as preferred.

The embodiment of the pressure switching mechanism described above is, on the whole, of coaxial construction. The latching projections, latching receptacles and axial abutments that are responsible for the axial positioning and locking are distributed uniformly over the circumference. The result of this, in overall terms, is a concentric distribution of forces, acting over a large circumference, such that the mechanism for a comparatively small installation volume, on the one hand, is able to withstand high loads and, on the other hand, is easily actuated with low switching forces.

In a further embodiment, the first and the second axial abutments are inclined at an angle corresponding to the angular faces of the latching projections of the feed sleeve. The angular faces of the latching projections thus meet the inclined axial abutments, which also gives rise to the pre-loading of the feed sleeve in the direction of rotation if the feed sleeve is latched in one of its two switching positions.

This ensures that, on the one hand, the feed sleeve adopts its intended latching position securely and accurately and, on the other hand, also remains there reliably until the action of the next switching impulse.

Various sites may be considered for the positioning of the pressure switching mechanism described above. It has been found to be expedient if the outer sleeve of the pressure switching mechanism is formed by the perimeter wall of the first tool section. As a result, the available installation space is utilized to the maximum extent. A very high mechanical load-bearing capacity can be achieved because of the largest possible diameter of the perimeter wall of the first tool section.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
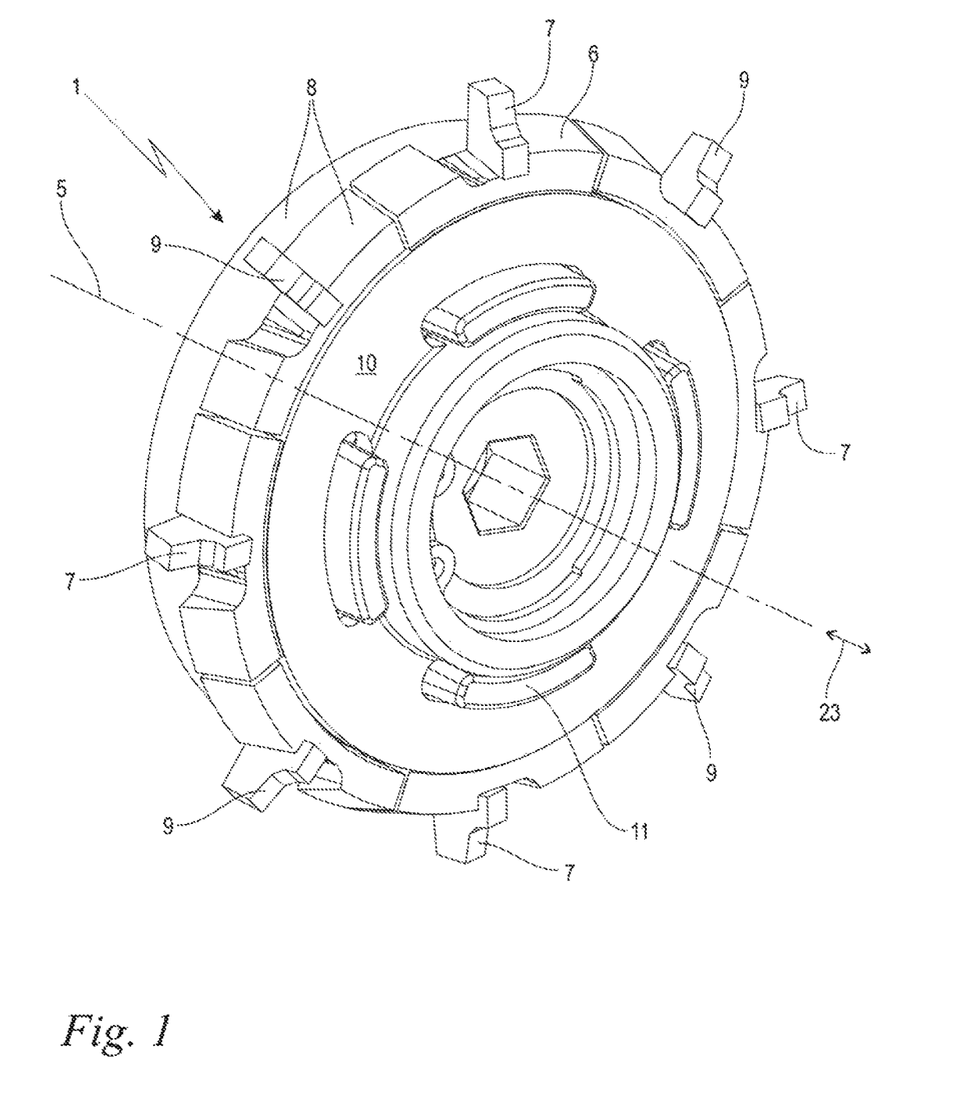
FIG. 1 shows in a perspective view a tool head with two tool parts that are capable of displacement axially in relation to one another.
Figure 3:
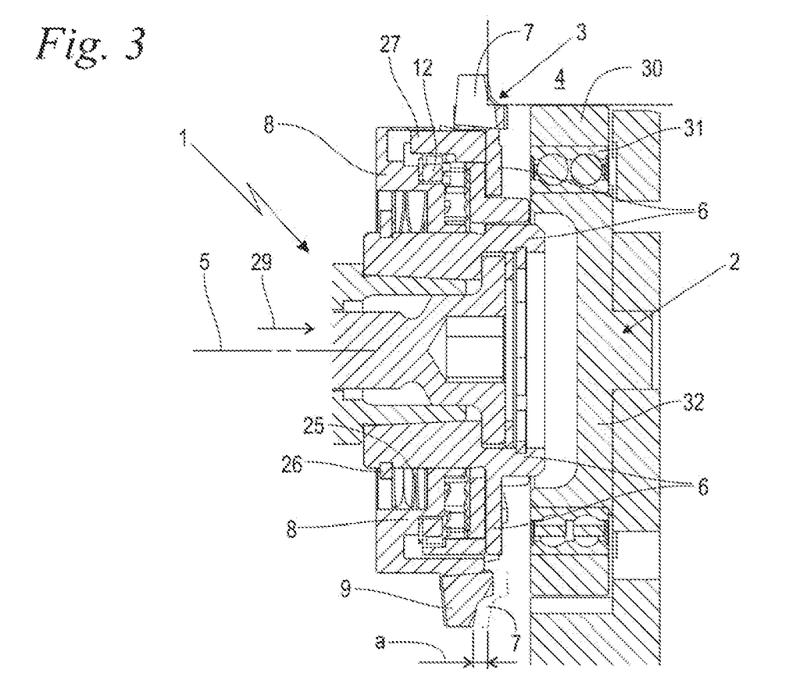
FIG. 3 shows in a representation in longitudinal section the tool head according to FIGS. 1 and 2 in interaction with a sensing roller, wherein the second tool section is latched in a passive position; and, FIG. 4 shows the arrangement according to FIG. 3 with the second tool section in the active position.
Figure 4:
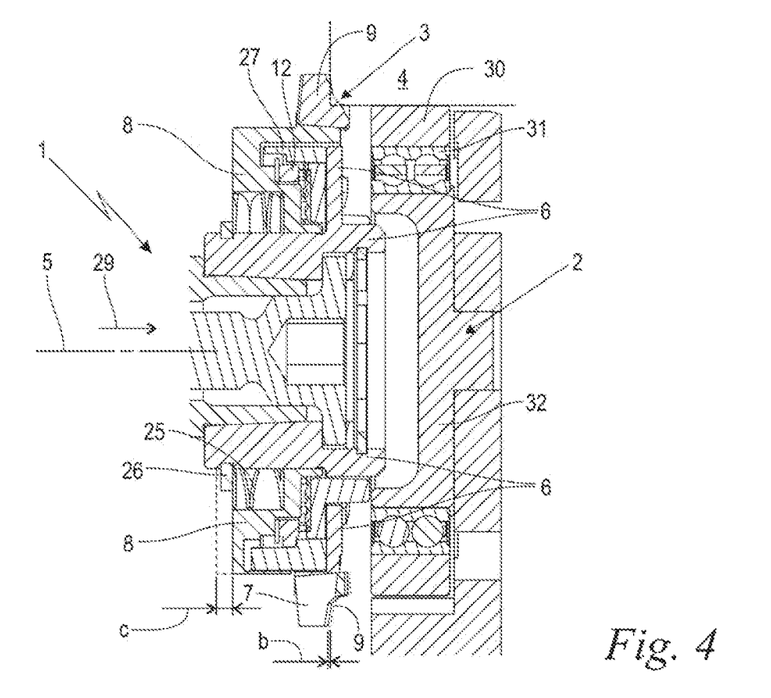

FIG. 1 depicts in a perspective view an illustrative embodiment of an inventive tool head 1 for machining edges 3 of a workpiece 4 as represented in FIGS. 3 and 4. These are preferably workpieces 4 in the form of panels, in particular those made of wood, wood-like materials or plastics including chipboard and fiberboard, of which the circumferential surfaces are encased by strips of material. The edges 3 of solid workpieces 4 without a coating or casing can also be machined, however.

The tool head 1 is configured substantially as a rotating body. It extends in a longitudinal axis 5 and is configured to be driven rotationally about this longitudinal axis 5. The longitudinal axis 5 thus also acts as a rotational axis. The tool head 1 has first and second blades 7, 9 distributed around its circumference, with which form milling of the edge 3 of the workpiece 4 (FIG. 3, 4) is performed.

The inventive tool head 1 includes a first tool section 6 and a second tool section 8, wherein the second tool section 8 relative to the first tool section 6 can be displaced back and forth in an axial direction, as indicated by a double arrow 23, that is, axially parallel to the longitudinal axis 5. The first tool section 6 has a set having a plurality of, in this case, for example, four first blades 7 distributed over the circumference. The second tool section 8 similarly has a set having a plurality of, and in this case, for example, a total of four second blades 9 distributed over the circumference. In the depicted preferred embodiment, the number of second blades 9 is equal to the number of first blades 7. The number can also be different, however, and in this context in particular can be an integer multiple or an integer divisor thereof. At all events the second blades 9, when seen in the circumferential direction, are positioned between the first blades 7, so that in this case a second blade 9 follows each first blade 7 alternately in the circumferential direction, and vice versa. The above-mentioned axial adjustability of the second tool section 8 relative to the first tool section 6 means that the associated second blades 9 are also adjusted axially in the same fashion relative to the first blades 7 of first tool section 6.

For the adjustment of the second tool section 8 relative to the first tool section 6, and for their locking in the adopted position in each case, the tool head 1 includes a pressure switching mechanism, described in more detail below, which has at least one actuation surface 11 acting in the axial direction. In the depicted preferred embodiment, the pressure switching mechanism 10 includes a plurality of, in this case, for example, four actuation surfaces 11 distributed over the circumference. For this purpose, the free end surface of the tool head 1 has a corresponding number of openings, through which finger-like projections with actuation surfaces 11 on the end face are introduced and project axially relative to the end surface of the main body of the tool. In this context, it can be further appreciated from the perspective representation according to FIG. 1 that the actuation surfaces 11, on the one hand in the axial direction, project beyond the first blades 7 and also beyond the second blades 9, and in addition lie inside the first blades 7 and inside the second blades 9 in relation to the radial direction oriented perpendicularly to the longitudinal axis 5. This applies preferably to all the axial adjustment positions of the second tool section 8 with its associated set of second blades 9.

Figure 2:
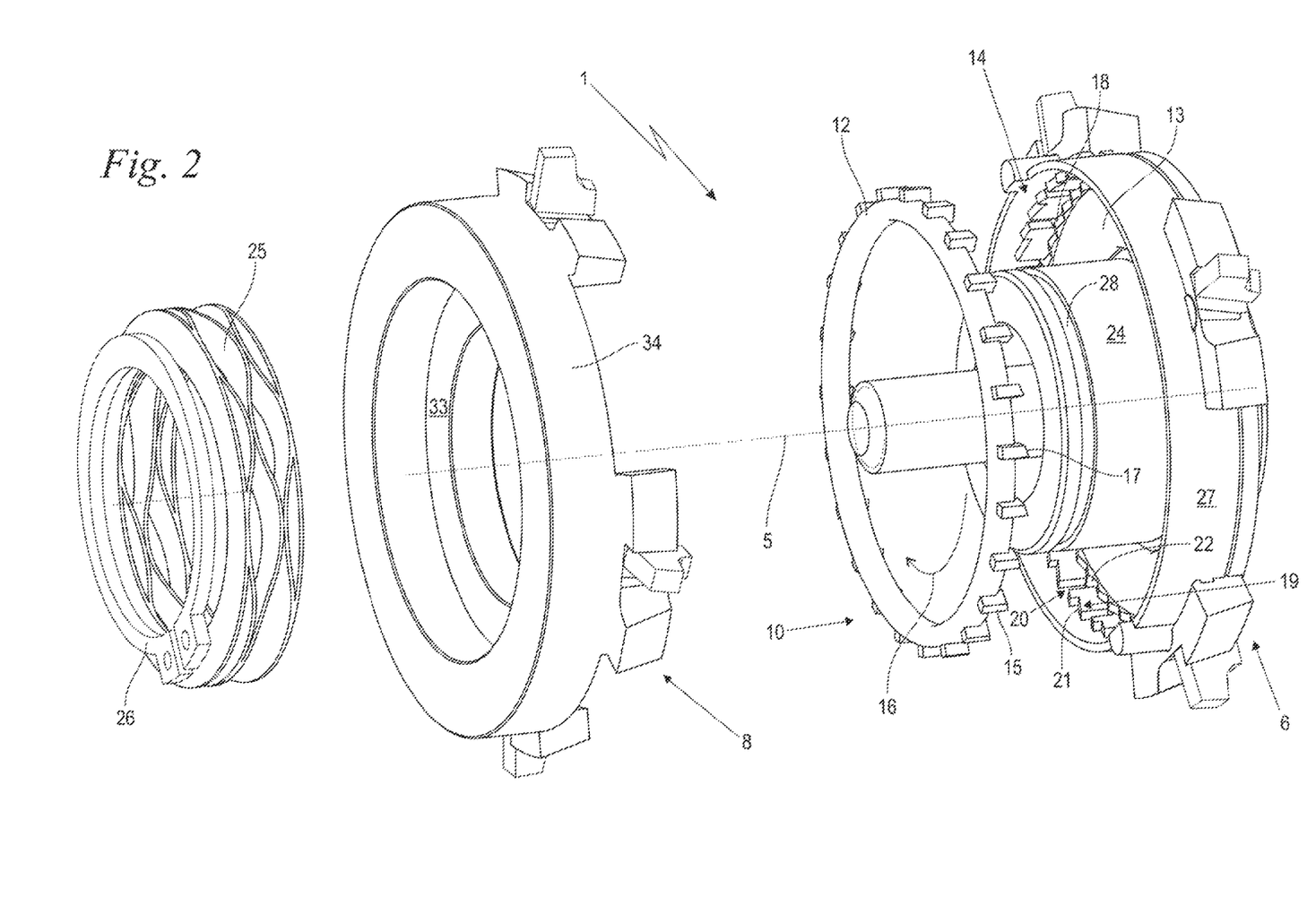
FIG. 2 shows in an exploded representation the tool head according to FIG. 1 with details of its internally located pressure switching mechanism.

FIG. 2 depicts, in a perspective exploded representation, the essential component parts of the tool head 1 according to FIG. 1 with its pressure switching mechanism 10. The pressure switching mechanism 10 includes a feed sleeve 12, a pressure sleeve 13 and an outer sleeve 14. The outer sleeve 14 in the depicted preferred embodiment is constituted by an outermost perimeter wall 27 of the first tool section 6. However, it can also be a separate sleeve in the hub region situated further inside. At all events, the outer sleeve 14 in the installed state encloses both the feed sleeve 12 and the pressure sleeve 13.

The first tool section 6 is provided with a radially inner hub 24, via which it can be installed securely on the tool spindle (not represented here) of a driver unit. The main body of the second tool section 8 has a central opening corresponding to the hub 24, via which the second tool section 8 is mounted axially on the hub 24 of the first tool section 6, that is, displaceably back and forth parallel to the longitudinal axis 5. In conjunction with FIGS. 3 and 4, it can be further appreciated that a radially outer perimeter wall 34 of the second tool section 8 at least partially encloses the perimeter wall 27 of the first tool section 6 in the region of the feed sleeve 12, the pressure sleeve 13 and the outer sleeve 14. A spring assembly 25 is threaded onto the hub 24 and bears against one end surface 33 of the second tool section 8 in the axial direction. At its end, the hub 24 has a circumferential groove 28, into which a securing ring 26 is introduced in such a way that the spring assembly 25 introduced between the securing ring 26 and the second tool section 8 is under axial pressure pre-loading. As a result, the second tool section 8 is pre-loaded to the right under the action of the aforementioned spring assembly 25 in FIG. 2, that is, in the direction of the free end of the tool head 1 or to the pressure sleeve 13 with an intermediate layer in the form of the feed sleeve 12. In other words, the spring assembly 25 presses against the second tool section 8, which transmits this pressure pre-loading to the adjacent feed sleeve 12. From there, the pressure pre-loading is transferred in a manner described in more detail below either onto the outer sleeve 14 or onto the pressure sleeve 13.

The pressure sleeve 13 is axially displaceable via the at least one actuation surface 11 described in more detail above against the feed sleeve 12 that has been pre-loaded in the manner described previously. In the case of a tentative press-in movement of the at least one actuation surface 11 (FIG. 1), the pressure sleeve 13 is thus brought initially into position against the feed sleeve 12. In the case of a further press-in movement, the pressure sleeve 13 and the feed sleeve 12 and also the second tool section 8 are pressed in together against the preload force of the spring assembly 25.

The feed sleeve 12 can adopt two different latching positions. To enable the feed sleeve to do this, it is rotatably mounted in the outer sleeve 14. The feed sleeve 12 has latching projections 15 projecting radially outwards and also axially towards the pressure sleeve 13, with which it is supported against the internal wall of the outer sleeve 14 in the radial direction. On their end faces facing towards the pressure sleeve 13, the latching projections 15 are provided in each case with faces 17, which are unilaterally inclined in the circumferential direction and therefore angular, acting in a direction of rotation 16. The pressure sleeve 13 for its part has angular faces 18 distributed over the circumference, which correspond to the angular faces 17 of the feed sleeve 12.

First and second latching receptacles 19, 20 with first and second axial abutments 21, 22 are arranged distributed alternately in the circumferential direction on the inside of the outer sleeve 14. This lies with its latching projections 15 either in the first latching receptacles 19 or in the second latching receptacles 20 in different rotation angle positions of the feed sleeve 12. Because of the axial spring pressure pre-loading described above, the feed sleeve 12 in both cases is pressed with its latching projections 15 into the respective first latching receptacles 19 or second latching receptacles 20, to such an extent that the latching projections 15, with their angular faces 17 on the end face, bear against the first or second axial abutments 21, 22 that are present in the bottom of the first or second latching receptacles 19, 20. The second axial abutments 22 lie deeper in the second latching receptacles 20 than the first axial abutments 21 in the first latching receptacles 19, and are thus displaced axially relative to the latter in the direction of the free end of the tool head 1 that is present on the right in the figure. Depending on whether the latching projections 15 bear against the first axial abutments 21 or against the second axial abutments 22, the feed sleeve 12 is in one of two possible axial positions. Since the second tool section 8 bears against the feed sleeve 12 under the spring pre-loading described above, the same is also true of its axial position. The second tool section 8 is capable of adopting one of two possible axial positions, as preferred, depending on the angle of rotation position of the feed sleeve 12.

In both cases, the latching projections 15 are retained in the circumferential direction by the respective first or second latching receptacles 19, 20. This is further supported by the fact that the first and second axial abutments 21, 22 corresponding to the angular faces 17 of the latching projections 15 are inclined at an angle. The respective angular faces slide against one another under the axial pre-loading, as a consequence of which the latching projections 15 are pressed against the side walls of the first or second latching receptacles 19, 20 in a circumferential direction and are retained there. This leads to locking of the feed sleeve 12 and thus to a locking positioning of the second tool section 8, in each case in its selected axial position.

The pressure sleeve 13 with its actuation surfaces 11 already mentioned by way of introduction is used for switching between the two aforementioned axial positions. A brief pressure impulse on the at least one actuation surface 11 (FIG. 1) brings about an axial depression of the pressure sleeve 13 and also of the feed sleeve 12, to such an extent that the latching projections 15 are no longer in engagement with their respective first or second latching receptacles 19, 20. The feed sleeve 12 is able to distort in the state in which it is depressed to such an extent. Since the axial pressure transmission between the pressure sleeve 13 and the feed sleeve 12 in addition takes place via the corresponding angular faces 18, 17, a sliding relative movement takes place in the circumferential direction in this case, according to which the feed sleeve 12 experiences a rotation in the direction of rotation 16 relative to the pressure sleeve that is stationary in the direction of rotation. The extension of the angular faces 18, 17 that is effective in the circumferential direction is so dimensioned that the forced rotation of the feed sleeve 12 corresponds in terms of its value to the angular distance of the second adjacent first or second latching receptacles 19, 20.

After the end of the pressure impulse applied by the pressure sleeve 13, the assembly including the second tool section 8, the feed sleeve 12 and the pressure sleeve 13 is pushed back axially once more because of the aforementioned spring pre-loading. However, the feed sleeve 12 is rotated with respect to the starting position to such an extent that its latching projections 15 no longer find their way into the same latching receptacles, but into the adjacent latching receptacles in the circumferential direction. Starting from the first latching receptacles 19, they now find their way into the second latching receptacles 20, whereas, starting from the second latching receptacles 20, they now find their way into the first latching receptacles 19. Each individual pressure impulse that is applied to the actuation surface 11 (FIG. 1) and the pressure sleeve 13 thus results in switching between the two axial positions of the feed sleeve 12 described above and, for this reason, of the second tool section 8.

FIGS. 3 and 4 further depict, in a representation in the longitudinal section, the tool head 1 according to FIGS. 1 and 2 in both of its different switching positions, wherein the line of intersection of the representation is selected in such a way that the region with a first blade 7 is represented on one side of the longitudinal axis 5, and the region with a second blade 9 is represented on the other side of the longitudinal axis 5. The tool head 1 together with an actuation element for its pressure switching mechanism constitutes an inventive tool system. The actuation element can be an abutment or a sensor and is constituted by a sensing roller 2 in the depicted preferred embodiment. The sensing roller 2, for its part, is constituted by a roller hub 32, a bearing 31 and a circumferential roller body 30, wherein the roller body 30 is capable of rotating about the hub 32 via the bearing 31. The tool head 1 and the sensing roller 2 are positioned coaxially to the longitudinal axis 5. The entire tool system is displaced against the schematically illustrated workpiece 4 to such an extent that the sensing roller 2 rests on the surface of the workpiece 4 with the circumference of its roller body 30. In this position, the surface of the workpiece 4 can be traced, for example when used in a machining center. Conversely, a stationary tool system is naturally also possible, in which the workpiece 4 is fixed in the sense of a continuous processing machine, wherein the workpiece 4 is then guided along the tool head 1. At any event, an orientation of the tool head 1 relative to the edge 3 of the workpiece 4 takes place in such a way that the edge 3 is machined, as preferred, either by the set of first blades 7 or by the set of second blades 9 of the tool head 1.

In the representation in longitudinal section according to FIG. 3, the depicted switching state of the tool head 1 is that in which the latching projections 15 are present in the first latching receptacles 19 (FIG. 2). The corresponding axial position corresponds to a passive position of the second tool section 8. In this case, the second blades 9 are recessed axially relative to the first blades 7 by a first axial difference dimension a, such that only the first blades 7 come into contact with the edge 3 of the workpiece 4 and perform an appropriate edge machining process.

For switching, the tool head 1 can now be displaced axially relative to the fixed actuation element or to the stationary retained sensing roller 2 in a short switching movement according to an arrow 29, to such an extent that the at least one actuation surface 11 comes briefly into position against the sensing roller 2 and is depressed in the manner described above. The tool head 1 is then moved back axially into its starting position relative to the sensing roller 2. As an alternative, the tool head can also be kept stationary for the switching procedure, wherein the actuation element or the sensing roller 2 is then displaced axially against the arrow 29 in a brief switching movement, to such an extent that the at least one actuation surface 11 is depressed. In any case, the position of the second tool section 8 is now switched in the manner described above in such a way that the latching projections 15 are present in the second latching receptacles 20 (FIG. 2). The second tool section 8 according to FIG. 4 has consequently adopted its second position, in this case its active position, in which it is displaced relative to the passive position (FIG. 3), as described above in more detail, about an axial displacement path c, to the free end face of the tool head 1, and in which the second blades 9 project axially between the first blades 7 relative to the first blades 7 in the direction of the arrow 29 about a second axial difference dimension b. In this case, the second blades 9 now find an application in the machining of the edge 3, whereas the first blades 7 lie further back and are out of service. This state is depicted in the representation in longitudinal section according to FIG. 4. Renewed, impulse-like pressure against the sensing roller 2 results in switching back into the passive position according to FIG. 3, so that switching back and forth between both positions is possible in a similar fashion.

It is understood that the foregoing description is that of the preferred embodiments of the invention and that various changes and modifications may be made thereto without departing from the spirit and scope of the invention as defined in the appended claims.

What is claimed is:

1. A tool head for machining edges of a workpiece, the tool head comprising:

a tool head body defining a longitudinal axis and being configured to be driven rotationally about said longitudinal axis, the longitudinal axis defining an axially forward direction and an axially rearward direction;

said tool head body including a first tool section defining a first circumference and having a set of first blades distributed over the first circumference;

said tool head body including a second tool section defining a second circumference and having a set of second blades distributed over the second circumference;

said second blades being positioned alternately with said first blades in a circumferential direction;

said second tool section being configured to be moveable relative to the first tool section in both said axially forward direction and said axially rearward direction back and forth between a passive position and an active position;

said second blades being axially retracted, in said axially rearward direction, relative to said first blades in said passive position;

said second blades projecting axially beyond said first blades in said axially forward direction in said active position;

said tool head body having a pressure switching mechanism configured to move said second tool section back and forth between said passive position and said active position in response to respective pressure pulses, each of said respective pressure pulses defined by:

pressure applied to said tool head in said axially rearward direction, a subsequent movement of said second tool section in said axially rearward direction, and then movement of said second tool section in said axially forward direction.

2. The tool head of claim 1, wherein said pressure switching mechanism has at least one actuation surface acting in said axially rearward direction.

3. The tool head of claim 1, wherein:

said tool head body defines a tool head circumference; and, said pressure switching mechanism has a plurality of actuation surfaces acting in said axially rearward direction, the plurality of actuation surfaces being distributed over said tool head in said circumferential direction.

4. The tool head of claim 2, wherein:

said at least one actuation surface projects axially beyond said first blades and said second blades in said axially forward direction.

5. The tool head of claim 2, wherein said at least one actuation surface lies radially inside said first blades and said second blades.

6. The tool head of claim 2, wherein:

said pressure switching mechanism includes an axial spring pre-loaded feed sleeve, a pressure sleeve configured to be displaceable by said at least one actuation surface axially against said spring pre-loaded feed sleeve, and an outer sleeve enclosing said feed sleeve and said pressure sleeve;

said feed sleeve is rotatably mounted in said outer sleeve to rotate in said circumferential direction relative to said outer sleeve, and said feed sleeve has a plurality of latching projections with first angular faces inclined in said circumferential direction ;

said pressure sleeve defines a pressure sleeve circumference and has second angular faces distributed over said pressure sleeve circumference; said second angular faces of said pressure sleeve correspond to said first angular faces of said feed sleeve so as to permit an interplay therebetween to cause rotation of said feed sleeve;

a plurality of first latching receptacles and a plurality of second latching receptacles have first axial abutments and second axial abutments, respectively, for said plurality of latching projections of said feed sleeve;

said plurality of first latching receptacles and said plurality of second latching receptacles are distributed alternately in the circumferential direction inside said outer sleeve; and, said first axial abutments are displaced axially relative to said second axial abutments.

7. The tool head of claim 6, wherein said first axial abutments and said second axial abutments are inclined at an angle corresponding to said first angular faces of said plurality of latching projections of said feed sleeve.

8. The tool head as claimed in claim 6, wherein: said first tool section has a perimeter wall; and, said outer sleeve of said pressure switching mechanism is formed by said perimeter wall of said first tool section.

9. A tool system comprising:
a tool head for machining edges of a workpiece, the tool head comprising:
a tool head body defining a longitudinal axis and being configured to be driven rotationally about said longitudinal axis, the longitudinal axis defining an axially forward direction and an axially rearward direction;
said tool head body including a first tool section defining a first circumference and having a set of first blades distributed over the first circumference;
said tool head body including a second tool section defining a second circumference and having a set of second blades distributed over the second circumference;
said second blades being positioned alternately with said first blades in a circumferential direction;
said second tool section being configured to be moveable relative to the first tool section in both said axially forward direction and said axially rearward direction back and forth between a passive position and an active position;
said second blades being axially retracted, in said axially rearward direction, relative to said first blades in said passive position;
said second blades projecting axially beyond said first blades in said axially forward direction in said active position;
said tool head body having a pressure switching mechanism configured to move said second tool section back and forth between said passive position and said active position in response to respective pressure pulses, each of said respective pressure pulses defined by:
pressure applied to said tool head in said axially rearward direction, a subsequent movement of said second tool section in said axially rearward direction, and then movement of said second tool section in said axially forward direction;
said pressure switching mechanism having at least one actuation surface acting in said axially rearward direction; and an actuation element;
wherein the pressure applied to said tool head during each of said respective pressure pulses is a result of said actuation element engaging said at least one actuation surface and causing said at least one actuation surface to move in said axially rearward direction.

10. The tool system of claim 9, wherein:
said actuation element is stationary; and
said tool head is movable axially relative to said stationary actuation element.

11. The tool system of claim 9, wherein said actuation element is a sensing roller for tracing a contour of the workpiece.

* * * * *